(12) United States Patent
Streuter et al.

(10) Patent No.: US 8,918,630 B1
(45) Date of Patent: Dec. 23, 2014

(54) SYSTEM, APPARATUS, AND METHOD FOR INITIATING A REBOOT OF A PERSONAL COMPUTER SYSTEM BY PRESSING A BUTTON ON AN ATTACHED STORAGE DEVICE AND CAUSING THE OPERATING SYSTEM ON THE ATTACHED STORAGE DEVICE TO BE BOOTED

(75) Inventors: Gary Streuter, San Clemente, CA (US); Randell Deetz, Costa Mesa, CA (US); Kenneth Burke, Costa Mesa, CA (US)

(73) Assignee: CMS Products Inc, Costa Mesa, CA (US)

( * ) Notice: Subject to any disclaimer, the term of this patent is extended or adjusted under 35 U.S.C. 154(b) by 0 days.

(21) Appl. No.: 12/968,626

(22) Filed: Dec. 15, 2010

Related U.S. Application Data

(60) Provisional application No. 61/287,032, filed on Dec. 16, 2009.

(51) Int. Cl.
*G06F 15/177* (2006.01)
*G06F 9/00* (2006.01)
*G06F 13/00* (2006.01)
*G06F 12/00* (2006.01)
*G06F 11/00* (2006.01)
*G06F 9/44* (2006.01)

(52) U.S. Cl.
CPC ............ *G06F 9/4408* (2013.01); *G06F 9/4401* (2013.01)

USPC .................. 713/2; 713/1; 709/222; 710/104; 711/115; 714/6.11; 714/15

(58) Field of Classification Search
USPC ........... 713/1, 2; 709/222; 710/104; 711/115; 714/6.11, 15
See application file for complete search history.

(56) References Cited

U.S. PATENT DOCUMENTS

| | | | | |
|---|---|---|---|---|
| 6,219,721 B1 * | 4/2001 | Su | | 710/2 |
| 7,434,042 B2 * | 10/2008 | Oguma | | 713/2 |
| 7,930,531 B2 * | 4/2011 | Chow et al. | | 713/2 |
| 2007/0198822 A1 * | 8/2007 | Hsu et al. | | 713/2 |
| 2008/0010446 A1 * | 1/2008 | Kim | | 713/2 |

* cited by examiner

*Primary Examiner* — Stefan Stoynov
(74) *Attorney, Agent, or Firm* — Law Office of Scott C Harris, Inc

(57) ABSTRACT

Controlling a boot operation form an alternate operating system by pressing a single predetermined key or simultaneously pressing a set of unique keys on the keyboard which causes the computer system to reboot using the operating system on an attached drive to be booted. The user can recover operational use of their computer system when the internal system drive suffers a software application or operating system failure. An attached storage device containing a bootable operating system, an application program in the host computer that can detect the pressing of a single or set of unique keys on the keyboard which will then cause the application to process boot files and force a reboot of the operating system with the attached storage device as the boot device.

12 Claims, 4 Drawing Sheets

```
                                 ,--31
         32                                              PRIOR ART
     33  ▸[boot loader]
     34  ▸timeout=0
         ▸default=multi(0)disk(0)rdisk(0)partition(1)\WINDOWS
         ▸[operating systems]
     35  ▸ multi(0)disk(0)rdisk(0)partition(1)\WINDOWS="Windows 2000 Professional" /fastdetect
     36  ▸multi(0)disk(1)rdisk(0)partition(1)\WINNT="Windows XP Professional" /fastdetect
       37
```

Figure 2A

```
                                 ,--39
         32
     33  ▸[boot loader]                                  PRIOR ART
     38  ▸timeout=0
         ▸default=multi(0)disk(1)rdisk(0)partition(1)\WINNT
         ▸[operating systems]
     35  ▸ multi(0)disk(1)rdisk(0)partition(1)\WINNT="Windows XP Professional" /fastdetect
       37 ▸multi(0)disk(0)rdisk(0)partition(2)\WINDOWS="Windows 2000 Professional" /fastdetect
       36
```

Figure 2B

SYSTEM, APPARATUS, AND METHOD FOR INITIATING A REBOOT OF A PERSONAL COMPUTER SYSTEM BY PRESSING A BUTTON ON AN ATTACHED STORAGE DEVICE AND CAUSING THE OPERATING SYSTEM ON THE ATTACHED STORAGE DEVICE TO BE BOOTED

This application claims priority from provisional application No. 61/287,032 filed Dec. 16, 2009, the entire contents of which are herewith incorporated by reference.

BACKGROUND

Multiple approaches to booting from more than one storage device and for selecting one of a plurality of operating systems are known. Systems often use boot.ini and the boot configuration data base. Microsoft® has created a detailed document showing how the boot configuration database (BCD) is architected and edited as BCD objects.

The capability of computer systems to boot from more than one storage device or the ability to boot a selected operating system from a number of operating systems has been present for quite some time. WINDOWS NT™ operating systems have been in the field since 1993 and have had multi-boot capability.

NT™ systems from NT 3.1™ through NT 5.2™ released in 2007 have typically used a boot preference file named boot.ini. This file, if present, is read by an early load portion of NT™ and processed. The file typically contains the ID and address of each partition and sub-folder in the partition that houses or contains an operating system, and the identity of a default operating system, and a timer value which states in seconds the amount of time the information will be displayed to a user before the default operating system will be booted.

Sophisticated users can edit the boot.ini file and change the default operating system to be booted and/or add or remove operating systems. See FIGS. 2A and 2B for examples of boot.ini files.

Starting with WINDOWS NT 6™ released in 2006, the boot.ini file was discarded and a new facility with increased capability called Boot Configuration Database (BCD) was introduced to control the booting of a system.

The BCD provides a firmware-independent mechanism for manipulating boot environment data for typically for WINDOWS VISTA™ and later operating systems. WINDOWS VISTA™ and later versions of WINDOWS use it to load the operating system or to run boot applications such as memory diagnostics. The BCD abstracts the underlying firmware. BCD currently supports both PC/AT BIOS and Extensible Firmware Interface (EFI) systems. BCD interfaces perform all necessary interaction with firmware.

The BCD allows developers to programmatically manipulate a BCD store or objects through the BCD WMI Provider™. The WMI Provider™ supports a unified programming interface that can be used for both local and remote management of BCD stores. The interface is independent of the underlying firmware, so developers can write one application that works on any type of system.

The reference manual for the BCD facility is available at microsoft's website and is incorporated by reference herein.

The manual describes the exact interface and how objects within the BCD are manipulated.

Additionally, if the operating system on the system drive becomes non-operational, and even if the user has a bootable backup storage device attached to the computer system, it can be a daunting task to use that backup as the primary bootable storage device. Until now, the user typically needed to change the BIOS settings to boot the backup storage device or remove the backup drive from its enclosure and install it into the computer system.

SUMMARY

Manually changing the boot order of the Boot Configuration Data is not a trivial task for an unsophisticated user. Performing an edit on the Boot Configuration Data can result in an unbootable condition.

Embodiments describe an improved programming interface to make changes in the boot order of a firmware-independent mechanism for manipulating boot environment data, e.g., the BCD in a PC.

Embodiments describe a new way to boot an attached storage device containing a bootable operating system without manually altering the system BIOS or physically moving the drive from the attached enclosure to the system.

An embodiment describes a new and unique system and method for booting an operating system from an attached storage device by a specified operation, e.g., pressing a single button on the attached storage device. This action and the underlying logic and apparatus causes the boot files to be automatically altered and a reboot to be forced, such that the reboot or restart uses the operating system contained on the attached storage device. This action and the underlying logic and apparatus causes the boot files to be automatically altered and a reboot forced such that the reboot or restart uses the operating system contained on the attached storage device.

BRIEF DESCRIPTION OF THE DRAWINGS

FIGS. 2A and 2B illustrate code used for boot loaders;

DETAILED DESCRIPTION

Figure 1:
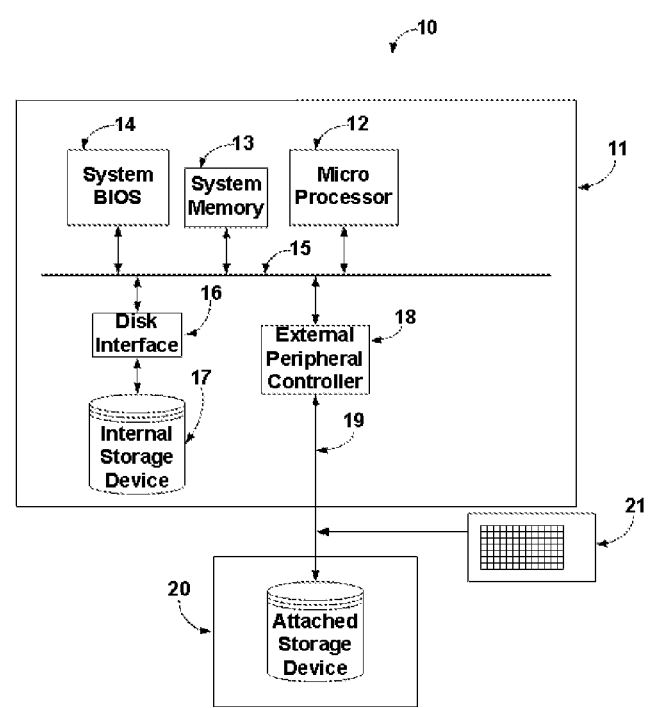
FIG. 1 shows a block diagram according to an embodiment.

Referencing FIG. 1 which depicts a typical personal computer 10 which may be any of a plurality of personal computers such as laptops, desktops, servers, or handheld devices. In this depiction, personal computer 11 contains a system bus 15 which provides a common bus for microprocessor 12, system memory 13, system BIOS 14, disk interface 16, internal storage device 17, external peripheral control 18, external bus 19, attached storage 20, and system keyboard 21. For clarity, there are several sub-systems not shown in this depiction such as a graphical user interface monitor, graphics controller, or mouse pointer which may be used with the computer.

FIGS. 2A and 2B depict two variations of a boot.ini file that could be used for displaying a boot menu to the user prior to the operating system, here WINDOWS™, being completely loaded. Boot.ini files are used by pre-WINDOWS VISTA™ computers for controlling boot order.

Boot.ini files can be used in two modes depending on the value of the timeout 33. The first mode allows the contents of the file to be displayed to the user at boot time if the timeout value 33 is some value other than zero. If the value of timeout value 33 is other than zero, the contents of the file identifying storage devices, partitions, and operating systems will be formatted and displayed as a menu allowing the user to select one of a number of operating systems to boot. If timeout value 33 is set to zero, the menu will not be displayed to the user and the operating system identified as default 34 or default 38 will be the operating system that is loaded.

Note that in the depictions of the boot.ini files shown in FIG. 2A and FIG. 2B the default operating system to be booted in FIG. 2A is contained in disk 0, partition 1, subdirectory "\WINDOWS" and in FIG. 2B the default operating system to be booted is contained in disk 1, partition 1, subdirectory "\WINNT".

FIG. 2A illustrates a first boot.ini file 31, where the timeout is zero. In this first version 31, the default operating system is WINDOWS™, showing WINDOWS 2000™ being on a first disk (disk 0) and WINDOWS XP™ being on a second disc.

FIG. 2B illustrates a second boot.ini file 39 in which the default operating system is WINDOWS NT™.

Keyboard 21 is a more or less standard keyboard typically found on a personal computer system. Keyboard 21 is shown in FIG. 1 as being connected to external bus 19 which may be of the form of any external data bus such as but not limited to USB, IEEE-1394, Serial Data Bus, or any other bus suitable for transporting data to and from personal computer 11. When PC application 42 is launched and started, it will request notification from the operating system for when the user presses a predetermined single unique key on keyboard 21 or simultaneously presses a predetermined set of unique keys. This event is shown in FIG. 3 and FIG. 4 as user presses alt boot keys on keyboard 21.

Figure 3:
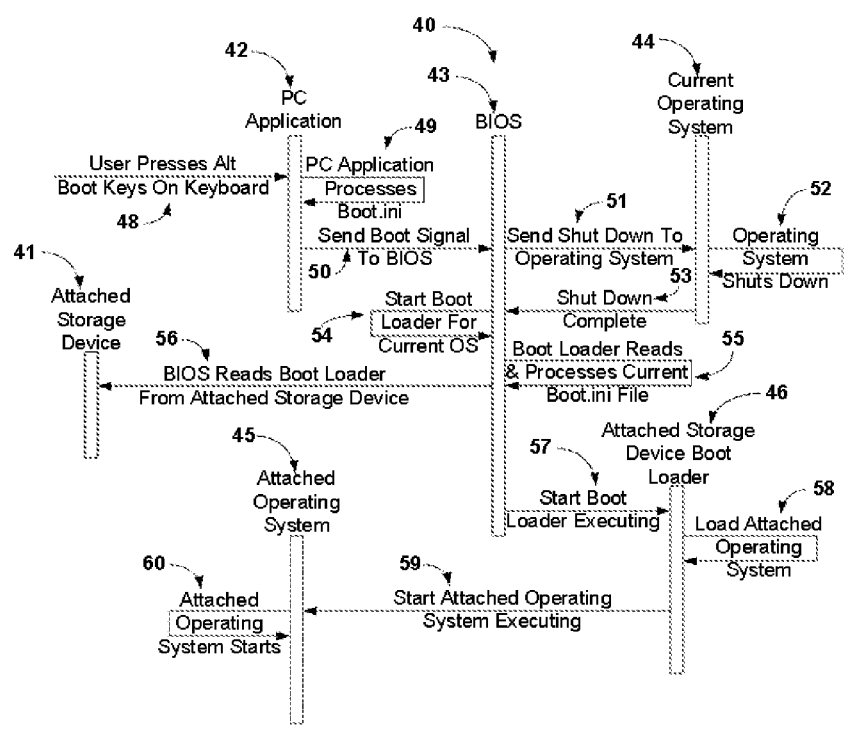
FIG. 3 illustrates a logic diagram according to an embodiment using boot.ini.
Figure 4:
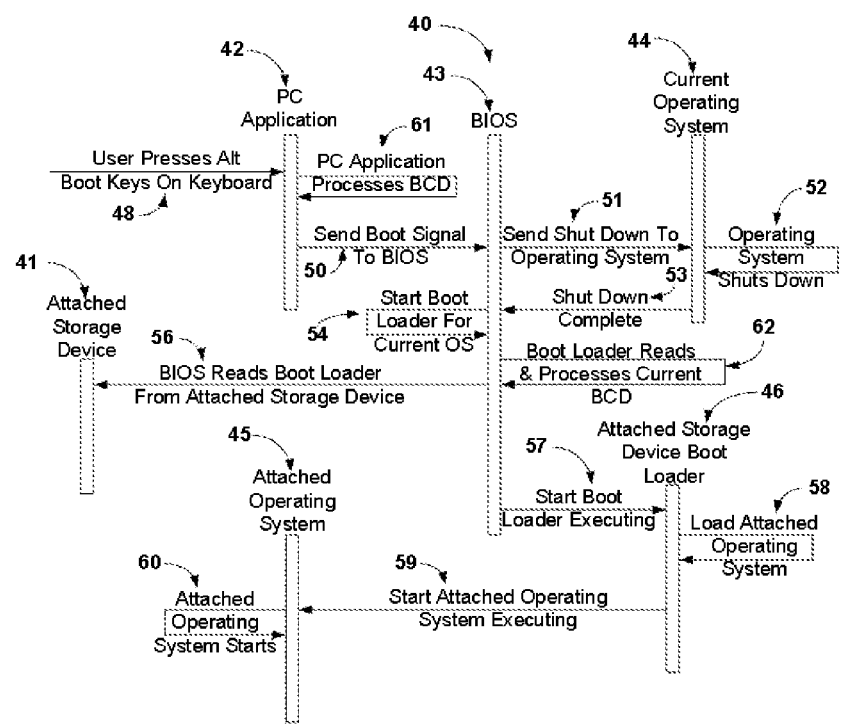
FIG. 4 illustrates a logic diagram according to an alternative embodiment using a BCD file.

Now referencing FIG. 3 where 40 is a logic diagram embodying the principles of the invention where current operating system 44 is a pre-WINDOWS VISTA™ operating system such as WINDOWS XP™ or WINDOWS 2000™. In FIG. 3, the vertical members or objects represent functional portions of a personal computer or functional portions of software and the horizontal lines represent actions or processing steps. Logic diagram 40 begins with user pressing alt boot keys on keyboard 21. PC application 42 is executing and receives notification of the predetermined keys being pressed. When PC Application 42 receives the boot key press notification from the operating system, PC application 42 performs PC application processes Boot.ini at 49. PC application processes Boot.ini 49 edits the Boot.ini file residing on internal storage device 17 such that the operating system resident on attached storage device 20 is set to be the default operating system. The Boot.ini file depicted in FIG. 2A as 31 will be altered to that depicted in FIG. 2B and written back to internal storage device 17. After PC application processes Boot.ini 49, processing is completed, PC application 42 will notify BIOS 43 to force a reboot by performing sent boot signal to BIOS 50. BIOS 43 will receive send boot signal to BIOS 50 and in turn will notify current operating system 44 by performing send shut down to operating system 51.

Current operating system 44 will receive the shut down notification from BIOS 43 and perform its orderly shut down processing by performing operating system shuts down 52. After current operating system 44 has finished shutting down, it will notify BIOS 43 by sending shut down complete 53 to BIOS 43. BIOS 43 will receive notification of shut down complete and performs a start boot loader for current OS 54. This processing step reads the boot loader from the master boot record of internal storage device 17 into system memory 13 and starts it to executing. The boot loader performs boot loader reads and processes current boot.ini file 55. This processing step loads sufficient software from the internal storage device 17 that will allow it to allow it to read the Boot.ini file from the internal storage device 17. Using the default entry for the operating system which is default operating system 38 in FIG. 2B, the software will perform BIOS reads boot loader from attached storage device 86 which reads the boot loader from attached storage device 20 into system memory 13. After the boot loader from attached storage device 20 has been read into system memory 13, BIOS 43 will perform start boot loader executing 57. At this point, attached storage device boot loader 46 will perform load attached operating system 58 which reads those portions of the operating system residing on attached storage device 20 that are required to load the full operating system. Once the operating system has been loaded into system memory 13, attached storage device boot loader 46 will send start attached operating system executing 59 to attached operating system 45. This processing step starts attached operating system 45 executing which performs attached operating system starts 60. At this point the operating system that is resident on attached storage device 20 is booted up and running.

In this way, by pressing a single predetermined boot key during the initial boot operation, the operation is automatically changed such that a different operating system is used for the boot up.

40 in FIG. 4 represents a logic diagram embodying the principals of the invention where current operating system 44 is a WINDOWS VISTA or newer operating system such as WINDOWS 7. In FIG. 4, the vertical members or objects represent functional portions of a personal computer or functional portions of software and the horizontal lines represent actions or processing steps Logic diagram 40 begins with user presses alt boot keys on keyboard 21. PC application 42 is executing and receives notification of the predetermined keys being pressed. When PC Application 42 receives the boot key press notification from the operating system, PC application 42 performs PC application processes Boot Configuration Data base 61. PC application processes Boot Configuration Data 61 edits the Boot Configuration Data base (DCB) file residing on internal storage device 17 such that the operating system resident on attached storage device 20 is set to be the default operating system. This processing step sets the default operating system as the operating system resident on attached storage device 20. After PC application processes Boot Configuration Data base 61 processing is completed, PC application 42 will notify BIOS 43 to force a reboot by performing sent boot signal to BIOS 50. BIOS 43 will receive send boot signal to BIOS 50 and in turn will notify current operating system 44 by performing send shut down to operating system 51.

Current operating system 44 will receive the shut down notification from BIOS 43 and perform its orderly shut down processing by performing operating system shuts down 52. After current operating system 44 has finished shutting down, it will notify BIOS 43 by sending shut down complete 53 to BIOS 43. BIOS 43 will receive notification of shut down complete and perform start boot loader for current OS 54. This processing step reads the boot loader from the master boot record of internal storage device 17 into system memory 13 and starts it to executing. The boot loader performs boot loader reads & processes current Boot Configuration Data base file 62. This processing step loads sufficient software from the internal storage device 17 that will allow it to allow it to read the Boot Configuration Data base file from the internal storage device 17. Using the default entry for the operating system which is default operating system 38 in FIG. 2B the software will perform BIOS reads boot loader from attached storage device 86 which reads the boot loader from attached storage device 20 into system memory 13. After the boot loader from attached storage device 20 has been read into system memory 13 BIOS 43 will perform start boot loader executing 57. At this point, attached storage device boot loader 46 will perform load attached operating system 58 which reads those portions of the operating system residing on attached storage device 20 that are required to load the full operating system. Once the operating system has been loaded into system memory 13, attached storage device boot loader 46 will send start attached operating system executing 59 to attached operating system 45. This processing step starts attached operating system 45 executing which performs attached operating system starts 60. At this point the operating system that is resident on attached storage device 20 is booted up and running.

In operation, the system can allow an alternative operating system to exist on an external drive or on a spare drive or spare partition of the computer. This can be an emergency operating system, or can be a periodically-updated backup of the system. When the user receives some indication that their main hard drive or the like has become compromised in some way, the user can carry out an operation on the keyboard to boot from the alternative hard drive. For example, this may include pressing a specified sequence of keys on the keyboard during the boot up process. Doing that causes the system to automatically edit the boot file, and automatically establish the previously backup operating system is the new operating system.

Although the invention has been described in language specific to structural features and/or methodological steps, it is to be understood that the invention defined in the appended claims is not necessarily limited to the specific features or steps described.

Rather, the specific features and steps are disclosed as preferred forms of implementing the claimed invention.

Equivalent elements can be substituted for the ones set forth above such that they perform in substantially the same manner in substantially the same way for achieving substantially the same result.

Also, the inventors intend that only those claims which use the words "means for" are intended to be interpreted under 35 USC 112, sixth paragraph. Moreover, no limitations from the specification are intended to be read into any claims, unless those limitations are expressly included in the claims.

The various illustrative logical blocks, modules, and circuits described in connection with the embodiments disclosed herein, may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. The processor can be part of a computer system that also has a user interface port that communicates with a user interface, and which receives commands entered by a user, has at least one memory (e.g., hard drive or other comparable storage, and random access memory) that stores electronic information including a program that operates under control of the processor and with communication via the user interface port, and a video output that produces its output via any kind of video output format, e.g., VGA, DVI, HDMI, displayport, or any other form.

When operated on a computer, the computer may include a processor that operates to accept user commands, execute instructions and produce output based on those instructions. The processor is preferably connected to a communication bus. The communication bus may include a data channel for facilitating information transfer between storage and other peripheral components of the computer system. The communication bus further may provide a set of signals used for communication with the processor, including a data bus, address bus, and/or control bus.

The communication bus may comprise any standard or non-standard bus architecture such as, for example, bus architectures compliant with industry standard architecture ("ISA"), extended industry standard architecture ("EISA"), Micro Channel Architecture ("MCA"), peripheral component interconnect ("PCI") local bus, or any old or new standard promulgated by the Institute of Electrical and Electronics Engineers ("IEEE") including IEEE 488 general-purpose interface bus ("GPIB"), and the like.

A computer system used according to the present application preferably includes a main memory and may also include a secondary memory. The main memory provides storage of instructions and data for programs executing on the processor. The main memory is typically semiconductor-based memory such as dynamic random access memory ("DRAM") and/or static random access memory ("SRAM"). The secondary memory may optionally include a hard disk drive and/or a solid state memory and/or removable storage drive for example an external hard drive, thumb drive, a digital versatile disc ("DVD") drive, etc.

At least one possible storage medium is preferably a computer readable medium having stored thereon computer executable code (i.e., software) and/or data thereon in a non-transitory form. The computer software or data stored on the removable storage medium is read into the computer system as electrical communication signals.

The computer system may also include a communication interface. The communication interface allows' software and data to be transferred between computer system and external devices (e.g. printers), networks, or information sources. For example, computer software or executable code may be transferred to the computer to allow the computer to carry out the functions and operations described herein. The computer system can be a network-connected server with a communication interface. The communication interface may be a wired network card, or a Wireless, e.g., Wifi network card.

Software and data transferred via the communication interface are generally in the form of electrical communication signals.

Computer executable code (i.e., computer programs or software) are stored in the memory and/or received via communication interface and executed as received. The code can be compiled code or interpreted code or website code, or any other kind of code.

A "computer readable medium" can be any media used to provide computer executable code (e.g., software and computer programs and website pages), e.g., hard drive, USB drive or other. The software, when executed by the processor, preferably causes the processor to perform the inventive features and functions previously described herein.

A processor may also be implemented as a combination of computing devices, e.g., a combination of a DSP and a microprocessor, a plurality of microprocessors, one or more microprocessors in conjunction with a DSP core, or any other such configuration. These devices may also be used to select values for devices as described herein.

The steps of a method or algorithm described in connection with the embodiments disclosed herein may be embodied directly in hardware, in a software module executed by a processor, or in a combination of the two. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. The memory storage can also be rotating magnetic hard disk drives, optical disk drives, or flash memory based storage drives or other such solid state, magnetic, or optical storage devices. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media. The computer readable media can be an article comprising a machine-readable non-transitory tangible medium embodying information indicative of instructions that when performed by one or more machines result in computer implemented operations comprising the actions described throughout this specification.

Operations as described herein can be carried out on or over a website. The website can be operated on a server computer, or operated locally, e.g., by being downloaded to the client computer, or operated via a server farm. The website can be accessed over a mobile phone or a PDA, or on any other client. The website can use HTML code in any form, e.g., MHTML, or XML, and via any form such as cascading style sheets ("CSS") or other.

Also, the inventors intend that only those claims which use the words "means for" are intended to be interpreted under 35 USC 112, sixth paragraph. Moreover, no limitations from the specification are intended to be read into any claims, unless those limitations are expressly included in the claims. The computers described herein may be any kind of computer, either general purpose, or some specific purpose computer such as a workstation. The programs may be written in C, or Java, Brew or any other programming language. The programs may be resident on a storage medium, e.g., magnetic or optical, e.g. the computer hard drive, a removable disk or media such as a memory stick or SD media, or other removable medium. The programs may also be run over a network, for example, with a server or other machine sending signals to the local machine, which allows the local machine to carry out the operations described herein.

Where a specific numerical value is mentioned herein, it should be considered that the value may be increased or decreased by 20%, while still staying within the teachings of the present application, unless some different range is specifically mentioned. Where a specified logical sense is used, the opposite logical sense is also intended to be encompassed.

The previous description of the disclosed exemplary embodiments is provided to enable any person skilled in the art to make or use the present invention. Various modifications to these exemplary embodiments will be readily apparent to those skilled in the art, and the generic principles defined herein may be applied to other embodiments without departing from the spirit or scope. Thus, the present invention is not intended to be limited to the embodiments shown herein but is to be accorded the widest scope consistent with the principles and novel features disclosed herein.

What is claimed is:

1. A programmed computer system comprising:
a computer comprising:
a first storage device designated as the primary storage device said first storage device containing at least a first bootable operating system;
an external data bus to a second storage device, said second storage device containing a second bootable operating system;
said first programmed computer having a BIOS on a first storage part, said BIOS that starts running at boot of the programmed computer system, and said programmed computer system having a boot configuration file that is stored on said first storage device, which is separate from said BIOS, said first programmed computer system running a first software application program that receives notification of predetermined items on a user interface being actuated, and operating to edit the boot configuration file on said first storage device without altering said BIOS, to command subsequent booting from said second storage device, and which then programmatically forces a reboot of said programmed computer system which will, due to the changes said first software application program made to said boot configuration file, cause said second operating system resident on said second storage device to be used for booting.

2. A system as in claim 1, wherein said programmed computer system is running an operating system where said configuration file is a boot.ini file.

3. A system as in claim 1, wherein said programmed computer system is running an operating system where said configuration file is a BCD file.

4. A system as in claim 1, wherein said external data bus to said second storage device is a connection to an external storage device.

5. A system as in claim 4, further comprising said second storage device designated as an attached storage device attached to said external data bus and containing said second bootable operating system.

6. A system as in claim 1, wherein said predetermined items include predetermined keys on the keyboard being actuated.

7. A computer program product, comprising a computer usable non transitory tangible medium having a computer readable program code embodied therein, said computer readable program code adapted to be executed to carry out:

for a first configuration, designating a first storage device as a primary storage device, and operating a computer to boot from said first storage device to a first bootable operating system in said first configuration, said computer using a BIOS on a first storage part to boot said computer, and where said BIOS starts running at boot of the computer;

running a first software application program that receives notification of predetermined items on a user interface being actuated;

editing a boot configuration file on said first storage device, without altering said BIOS, to command subsequent booting from another storage device responsive to receiving said notification during a boot of said computer; and programmatically forcing a reboot of said computer based on said receiving said notification during the boot of said computer according to changes made to said boot configuration file, to thereafter cause the operating system resident on said another storage device to be used for booting.

8. A product as in claim 7, wherein said computer is running an operating system where said configuration file is a boot.ini file.

9. A product as in claim 7, wherein said computer is running an operating system where said configuration file is a BCD file.

10. A product as in claim 9, wherein a connection to another storage device is a connection to an external storage device.

11. A product as in claim 10, further comprising said external storage device designated as the attached storage device attached to an external data bus and containing at least a second bootable operating system.

12. A product as in claim 7, wherein said predetermined items include predetermined keys on the keyboard being actuated.

\* \* \* \* \*